(12) United States Patent
Willis

(10) Patent No.: US 6,754,013 B2
(45) Date of Patent: Jun. 22, 2004

(54) ADJUSTABLE MOUNT FOR OPTICAL COMPONENTS

(75) Inventor: Chris L. Willis, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/217,686

(22) Filed: Aug. 12, 2002

(65) Prior Publication Data

US 2003/0035229 A1 Feb. 20, 2003

Related U.S. Application Data

(60) Provisional application No. 60/313,303, filed on Aug. 17, 2001.

(51) Int. Cl.[7] ............................................. G02B 7/02
(52) U.S. Cl. ..................... 359/819; 359/822; 359/831
(58) Field of Search ............................ 359/819, 822, 359/831, 694, 704; 396/526; 362/455; 353/100

(56) References Cited

U.S. PATENT DOCUMENTS

| | | | | |
|---|---|---|---|---|
| 3,700,313 A | * | 10/1972 | Karr et al. | 359/873 |
| 3,814,365 A | | 6/1974 | Mackenzie | 248/278.1 |
| 3,897,139 A | * | 7/1975 | Caruolo et al. | 359/873 |
| 3,966,309 A | | 6/1976 | Mohler | 359/874 |
| 4,687,287 A | | 8/1987 | Lukas et al. | 385/134 |
| 4,869,583 A | | 9/1989 | Tiedje | 359/876 |
| 4,893,899 A | * | 1/1990 | Huckenbeck | 359/694 |
| 5,019,837 A | | 5/1991 | Schwarz | 347/257 |
| 5,177,644 A | | 1/1993 | Stark | 359/896 |
| 5,757,561 A | | 5/1998 | Sechrist et al. | 359/822 |
| 5,930,057 A | | 7/1999 | Sechrist et al. | 359/822 |
| 6,016,230 A | | 1/2000 | Nunnally et al. | 359/819 |
| 6,198,580 B1 | | 3/2001 | Dallakian | 359/822 |
| 6,304,393 B1 | | 10/2001 | Sechrist et al. | 359/822 |
| 6,480,347 B1 | * | 11/2002 | Spring | 359/831 |

OTHER PUBLICATIONS

Griffith, Peter et al, Optical Mounts: Ignore The at Your Peril, Photonics Spectra, Sep. 1998, Laurin Publishing Co., Inc.
Newport Corporation, Application Note Opto–Mechanics 2, Fast Steering Mirror Technology: Active Beam Stabilization, Newport Corporation, 2001, Irvine, CA.
Newport Corporation, Opto–Mechanics, MFM Series—Flexure Industrial Optical Mounts (product catalog), pp. 610–611, Newport Corporation, Irvine, CA.

* cited by examiner

Primary Examiner—Ricky Mack
Assistant Examiner—Brandi Thomas
(74) Attorney, Agent, or Firm—Maine & Asmus

(57) ABSTRACT

An apparatus for mounting optical components and adjusting its orientation with respect to the optical axis of other components in an optical system. In one embodiment, the multi-axis gimbal mounting apparatus utilizes a single piece main structure having a pair of live hinges and a locking feature that enhances two kinds of stability. First, the adjustable elements of the mount remain in the intended position when the locking mechanism is actuated with minimal cross-talk between the locking features and the adjustment features. Second, the adjustable elements of the mount remain in the intended position when the mount or the system in which it resides is exposed to extreme environmental perturbations of vibration, temperature, shock, and acceleration. This mount is suitable for use in military laser systems, cryogenic systems, and other industrial optical instruments subjected to harsh environments such as aircraft, ship, and battlefield deployed devices. Furthermore, the mount is compact, easy to adjust, has high resolution and flexibility for optical component mountings, and is easily manufactured.

20 Claims, 4 Drawing Sheets

ADJUSTABLE MOUNT FOR OPTICAL COMPONENTS

CROSS REFERENCE TO RELATED APPLICATIONS

This application claims priority under 35 USC 119(e) to U.S. Provisional Patent Application No. 60/313,303 entitled "Adjustable Mount For Optical Components", filed on Aug. 17, 2001.

FIELD OF INVENTION

This invention relates to a device for mechanically adjusting an optical element, and more specifically to a device for adjusting the tilt angle of a lens or mirror and locking the position in a manner that is stable over temperature, time and environmental stresses.

BACKGROUND

An optical mount is a device that points a laser beam by controlling the orientation of an optic. In a laser system, a laser beam strikes an optic and is directed to a further point on the optical pathway by the interaction between the beam and the optic. The optical mount can be used to redirect the laser beam to another point by repositioning the optic.

There is a requirement in laser systems for very high thermal and mechanical stability in order to maintain beam quality, output power, beam divergence and mechanical boresight. Lasers are used in precision applications, such as surveying and military targeting, and in demanding environments, such as the environments in which military laser systems typically operate, have such very high stability requirements.

Ideally, enhanced stability laser systems would be designed and built with no adjustable components. With everything immovably fixed, alignment and boresight stability would depend solely on the quality of the basic design. There would be less tendency for misalignment in the field. Unfortunately, this option would lead to lasers with relatively broad tolerances and relatively poor performance. Over the years, the laser system industry has developed adjustment systems for lasers and the optical components with which they operate that result in very good laser alignment and stability—albeit at the cost of additional system complexity, increased manufacturing time for alignment of the laser system, and increased labor costs. For laser systems having high stability requirements, such as military laser systems, the additional complexity, time and alignment labor costs are significantly higher.

The use of adjustable mounting apparatus for supporting optical components in a laser system such as optical fibers, mirrors, beam splitters, lenses, gratings, and the like, is known. For example, it is frequently necessary to position a first optical element, such as a mirror, optical fiber, or waveguide relative to a second optical element, such as another mirror, optical fiber, waveguide, or beam expander microscope objective lens. Frequently, the relative positioning of such optical components must be very precise, often requiring accuracies on the order of wavelength dimensions. Even smaller allowable tolerances are anticipated in the future.

One approach to the design of precision laser system alignment mounts has been based on kinematic mounting, where three directional constraints determine the alignment. Typically, this might be accomplished with two plates, one mounted on the other at three points, the first point being a ball in socket in each of the plates, the second point being a ball in v-grooves in each plate aligned radially with the sockets, and the third point being a screw threaded through one plate and resting on the surface of the second plate on a radial line from the sockets. The plates can be held together with springs attached to their outer edges. This mechanism has a hinge point formed by the two balls. When the screw is adjusted, one plate will tilt with respect to the other and, if one plate is fixed, the edge of the second plate will be translated perpendicular to the radial line from the hinge to the adjustment screw. The difficulty with this semi-kinematic mounting mechanism is that, as additional adjustments are needed along other axes, additional alignment assemblies must be stacked, thereby increasing the size and complexity of the laser system.

Typical alignment fixtures use a pair of screws to set the alignment in one direction. One screw is used to push the alignment fixture while the other is used to pull the alignment fixture (opposing screws). When the correct alignment of the laser system has been achieved, both screws are "tightened" to prevent any additional movement of the alignment fixture when the system is exposed to shock and vibration environments. Tightening the adjustment screws, however, will change the system alignment just performed unless it is exactly balanced, and detracts from the ability to make very fine alignment adjustments. Stability of such a locking system is also questionable because the stress induced in the mechanism by the screws is along the direction of adjustment. When the stress changes due to changed environmental conditions, the adjustments change as well. Achieving the exact adjustment balance is very tedious and time consuming, resulting in increased cost and time for manufacturing the laser system.

An alternative approach to locking a laser system's alignment has been to use a single screw pushing against a stiff spring. To lock the alignment fixture after the laser system has been aligned, a nut on the single screw is tightened against the fixture. This is a variant of the two screw approach described in the paragraph above. Both of these locking schemes suffer the same problem of potentially changing the just-performed alignment setting when the locking nut tension is increased, again causing additional time and effort to be spent aligning the laser system, along with the added attendant cost. Both schemes also suffer from the same stability problem because of their reliance on the stress conditions of the interface between the adjustment screw and the mount along the direction of travel.

A variety of optical elements can be selected for use as a laser beam relay, depending upon it purpose and application. Laser system design involves a continuing struggle to balance laser performance requirements against the various operational and environmental stability requirements in which the system will operate, and to balance the ease of manufacture and alignment of the laser system against its requirements for long and short term stability in the environment where the delivered laser system will be used. The task of optically aligning the output of a laser beam is alleviated to some extent by the systems disclosed in the prior art.

In addition, U.S. Pat. No. 4,869,583 discloses a laser relay mounting assembly which receives and conducts a laser beam wherein the laser relay mounting assembly adjusts the laser output coincident with a desired axis which further describes a locking screw. U.S. Pat. No. 6,198,580 describes a gimbaled optical mount using a bearing element as a pivot point. There is an optical mount with a locking fastener disclosed in U.S. Pat. No. 6,016,230.

However, the state of the art implementations have yet to satisfy the commercial applications for an optical mounting and there is considerable room for improvement. Thus, there is a need for improved apparatus for easy alignment of optical components that provides low cross talk and enhanced locking strength. In particular, there needs to be an improved locking mechanism that does not impart forces in the angular direction. There is also a need for improved apparatus that permits fine alignment of optical components and a means for quickly locking the adjusted position of the optical element. Also, there is a need for improved apparatus that will permit aligned optical components to retain their alignment under very adverse and demanding operational and environmental conditions, such as the environments in which military laser systems operate. The locking mechanism should be strong to overcome adverse environmental conditions.

SUMMARY OF THE INVENTION

The invention is devised in the light of the problems of the prior art described herein. Accordingly it is a general object of the present invention to provide a novel and useful apparatus and technique that can solve the problems described herein. The foregoing needs are satisfied by the apparatus disclosed herein for easy mounting and alignment of optical components in such a manner that permits aligned optical components to retain their alignment under very adverse and demanding operational and environmental conditions. In addition, the mounting and alignment apparatus herein disclosed permits much finer alignment of optical components and permits faster alignment adjustment of the optical components.

In one embodiment the present invention comprises three plates coupled by live hinges that provide a two axis gimbal adjustable mount, wherein the locking mechanism sandwiches the moveable plates with a contact force perpendicular to the adjustment axes. The configuration of the present invention allows low cross talk and an environmentally stable clamp.

The mounting described herein can be used to hold optical elements that need to be angularly adjusted, such as optical fibers, mirrors, beam splitters, lenses, and gratings. In one embodiment the adjustable optical element mounting is fabricated from a solid block of material and has two live hinges formed therein by narrow cuts through most of the block of material. The axes of the two live hinges lie on radial lines that typically perpendicular (orthogonal) to each other; and the axes of the two live hinges also typically lie perpendicular (orthogonal) to the optical axis of the optical element that is fastened in the optical component mounting. The two live hinges are also oriented so that the motion of each hinge axis is uncoupled or independent from the motion of the other hinge axis.

The locking feature of this optical component mounting system clamps the adjustable elements of the mount orthogonal to the direction of their motion. The locking screw for each axis does not touch the adjustable element. Instead, the locking screw passes through a clearance hole in the adjustable element allowing the locking flexures to "sandwich" the adjustable element. When the locking screw is not tight, the adjustable element slides between the locking elements that form the bread of the sandwich. In this way a locking mechanism is formed that does not create cross talk to the adjustable element. This facilitates speed and ease of alignment, as well as a rigid final assembly that lends itself to dimensional stability in rugged environments, such as those typically experienced in military applications.

In order to use a single screw for adjustment in each axis, a spring action is provided by each live hinge of the mount. The flexures can be machined with the adjustable plates biased closed, or an external temporary spring similar to a clothespin or large paperclip can be added. In addition, the flexures for the adjustable elements can be machined as separate pieces and then laser welded, screwed and glued, or otherwise fastened to the bases of the adjustable elements to connect the adjustable elements and thereby lower the cost of manufacture.

The design of this optical component mounting system is also configured to provide a fixed outer frame that is very rigid, for use in attaching the mounting to a laser system chassis. Adjustment screws for aligning the optical element fastened in the component mounting are located in the rigid outer frame for alignment stability.

By using live hinges created by machining slots in the material from which the optical component mounting is made, and locating them on two orthogonal lines radiating from the optical axis, the angular adjustments of the optical component in the mounting are made independent of each other. Thus, the process of aligning the optical component in the mounting is simplified. As shown in FIG. 2, the reference to the X axis and Y axis refers to the coordinate system depicted and more particularly to the angular adjustments along the X axis and the Y axis, more particularly, a $\theta_X$ and $\theta_Y$ adjustment. For convenience, the reference to the X axis and the Y axis herein relate to the angular $\theta_X$ and $\theta_Y$ adjustment An object of the invention is a mounting apparatus for mounting an optical element such that the optical axis of the optical element is substantially aligned with corresponding elements in an optical system. The apparatus comprises a mounting body with a first section and a second section separated by a gap and coupled by a live hinge, wherein the first section and the second section have a hinged end at the live hinge and a free end opposing the hinged end, and wherein the first section has an optical receptacle for securing the optical element. There is an adjusting means for changing the gap between the first section and the second section at the free end, thereby adjusting an angular alignment in a first direction. A spring means is coupled to the first section and the second section, thereby providing resistance to increasing the gap. Finally, there is a locking means coupled to the first section and the second section securing the angular adjustment with a contact force substantially perpendicular to the first direction.

An object includes the mounting apparatus, wherein the locking means is a pair of plates secured proximate the free end, and wherein the plates extend across the gap and are secured to the first section and the second section. Additionally, the adjusting means is a screw threaded through the first section and contacting the second section.

Another object includes the live hinge being a remaining portion of the mounting body and the gap is a slot between the first section and the second section. Alternatively, wherein the live hinge is a portion of flexural material secured at the hinged end between the first section and the second section It should be understood that the mounting apparatus accommodates an optical element which is selected from the group comprising: a lens, a mirror, a single optical fiber, an optical fiber bundle, a grating and a prism.

Yet a further object includes the spring means being selected from the group comprising: an external spring mounted across the gap at the free end, a clamp structure clamped across the gap, and an inward bias force introduced by a width of the gap being less at the free end and larger at the hinged end.

An object of the invention is a two axis gimbal mounting structure for alignment of an optical element, comprising a housing having a base plate, a middle plate and a front plate. The base plate and middle plate are separated by a first slot and coupled by a first flexible hinge at a first hinge end, and the middle plate and the front plate are separated by a second slot and coupled by a second flexible hinge at a second hinged end. The optical element mount to the front plate. There is a first means for angularly adjusting a first axis of the optical element by changing a gap dimension of the first slot at an adjusting end opposing the first hinge end. There is also a second means for angularly adjusting a second axis of the optical element by changing a gap dimension of the second slot at an adjusting end opposing the second hinge end. In addition, there is a first locking mechanism sandwiching the base plate and the middle plate using a force perpendicular to the first axis, and a second locking mechanism sandwiching the middle plate and the front middle plate using a force perpendicular to the second axis. The two axis gimbal mounting structure uses the first adjusting means to align the first axis of the optical element and the second adjusting means is used to align the second axis of the optical element. In a preferred embodiment, the first axis and the second axis are approximately perpendicular. An additional aspect of the two axis gimbal mounting structure is the inward spring bias of the first slot and the second slot to maintain an opposing resistance to changing the gap dimension.

A further object of the two axis gimbal mounting structure is a removeable alignment mechanism that is secured across the adjusting end used by the first and second means for angularly adjusting the respective first and second axis.

An additional object of the first means for angularly adjusting the first axis is an elongated member threadably engaging the middle plate and contacting the base plate thereby altering the gap dimension of the first slot. Also, the second means for angularly adjusting the second axis is an elongated member threadably engaging the front plate and contacting the middle plate thereby altering the gap dimension of the second slot.

An object of the invention is an apparatus for mounting an optical element with a corresponding optical axes aligned with an optical axes of other elements in an optical system, the apparatus comprising a unitary housing having a base section, a middle section and a front section, each section substantially parallel and coupled to each other by two small sections. The first small section forming a first live hinge between the base section and the middle section having a first free end opposing the live hinge. There is a second live hinge between the middle section and the front section with a second free end opposing the second live hinge. Each section is substantially separated from each other by a respective first and second gap, wherein the first and second gap is formed from narrow slots extending substantially through the housing leaving the respective small sections. The first live hinge allows adjustment along a first axis and the second live hinge allows adjustment along a second axis. In a preferred embodiment the first and second axis are substantially orthogonal. There is a first adjustment member threadably interconnecting the middle section and contacting the base section thereby altering the first gap and adjusting along the first axis. There is also a second adjustment member threadably interconnecting the front section and contacting the middle section thereby altering the second gap and adjusting along the second axis. The device includes a first pair of locking plates oriented on each side end of the base section and the middle section proximate the first free end. The first pair of locking plates is used for bridging the first gap and locking the base section to the middle section with a force substantially orthogonal to the first axis. A second pair of locking plates is oriented on each side end of the middle section and the front section proximate the second free end. The second pair of locking plates is used for bridging the second gap and locking the middle section to the front section with a force substantially orthogonal to the second axis. Finally, there is an optical receptacle on the front section for securing the optical element.

Another object includes where the first and second pair of locking plates have a central flexure section. The central flexure section of the locking plates allows the plates to have some flexibility in the direction of the clamping force. The flexure has no impact on the structural integrity once the plates are locked into place.

An additional object is the first and second pair of locking plates using a locking bolt extending from the first and second pair of locking plates through a hole in the middle and front sections respectively, with a corresponding nut on the respective opposing first and second pair of locking plates. Included as a variation is where the hole is oversized that allows a securing bolt to cleanly pass through the plates without contact.

And a further object is the apparatus for mounting, wherein the first adjustment member and the second adjustment member are removed from contact with the respective base section and the middle section after alignment.

In addition, further comprising a threaded insert engaging the adjustment member, wherein the insert is a dissimilar material form the adjustment member.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Figure 1A:
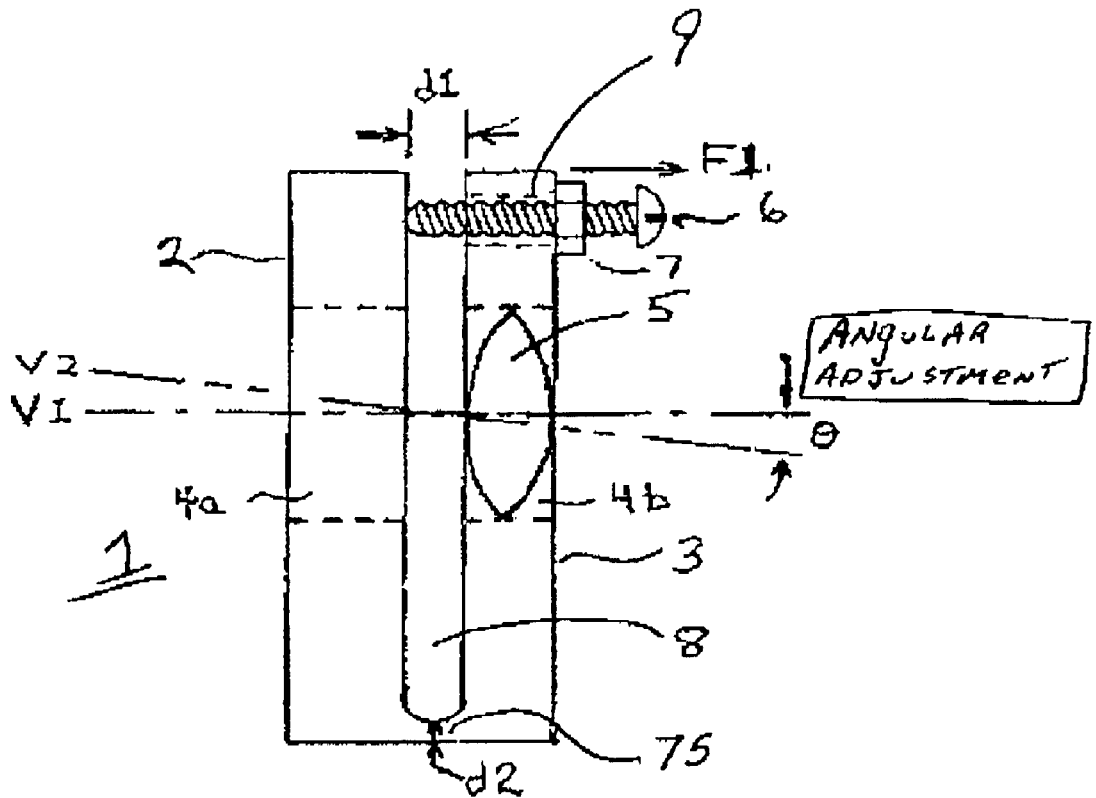
FIG. 1a shows a single axis adjustable optical mount with a live hinge

FIG. 1a shows one embodiment that is applied to a device for adjusting the optical axial position of a group of focusing lenses. As shown in FIG. 1a a live hinge 1 is formed of a single piece of metal 75 comprising two side pieces 2 and 3 joined at the bottom and containing a narrow slot 8. Side pieces 2 and 3 are joined at the bottom by a substantially thin bridge of metal 75 having a thickness d2 to allow the side pieces 2 and 3 to flex with respect to each other to provide a living hinge spring function. In the live hinges 11 and 12 shown in FIGS. 2, 3, and 4, the dimension d2 will be less than approximately 0.010 inches if mounting 10 is made of Aluminum, will be less than approximately 0.005 inches if mounting 10 is made of steel, and will be between these two dimensions if mounting 10 is made of Titanium. The area of the hinge with dimension d2 can be manufactured separately and fastened to the bottom of side pieces 2 and 3 in a first instance, wherein other materials with differing physical properties can be used.

In the embodiment of FIG. 1a, side piece 2 is thicker than side piece 3, and is used to attach the living hinge 1 to a frame or other base by fastening means that are not shown in this Figure. There are also coaxial holes 4a and 4b cut respectively through side pieces 2 and 3. A lens 5 is mounted in hole 4b for illustrative purposes, but other optical elements could similarly be mounted therein. For example, in a very small version of the live hinge, an optical fiber or bundle of fibers could be mounted in hole 4b. A mirror could be installed in hole 4b, in which case the corresponding hole 4a in side piece 2 would not be necessary. There is also a threaded hole 9 through the upper portion of side piece 3 in which is threaded an adjustment screw 6. It should be obvious to those in the art that it is only necessary that the screw 6 have a threaded section that interacts with the threaded hole 9 and the portion interacting with side piece 2 can have a flatted end or covering.

In their relaxed state, the free ends of side pieces 2 and 3 are spaced a distance d1 apart as shown in FIG. 1a. As adjustment screw 6 is turned into the threaded hole 9 through the upper portion of side piece 3, the screw end initially contacts the inside of side piece 2. As adjustment screw 6 is screwed in further, it pushes against side piece 2, creating a force F1 on side piece 3 that forces side piece 3 away from side piece 2. To permit this movement of side piece 3, the metal at the bottom of slot 8 flexes, forming the live hinge used in implementing the adjustable mount. A locking nut 7 or similar device aids in keeping the screw from thread slippage.

Figure 1B:
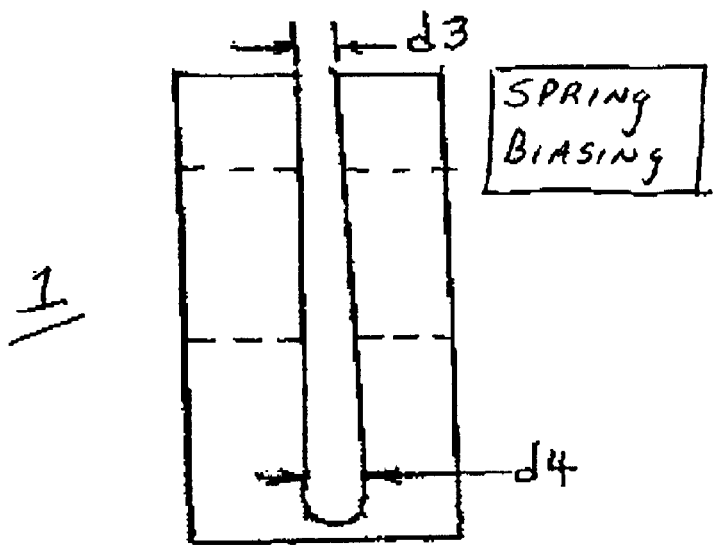
FIG. 1b shows a live hinge with a built in spring bias that eliminates the need for a separate spring

As shown in FIG. 1b, live hinge 1 is spring loaded toward side piece 3 by one of the methods mentioned herein (biasing, external spring, or internal spring), the flexing at the bottom of slot 8 creates a spring force equal and opposite to force F1. In the described embodiment of biasing, this spring force attempts to return side piece 3 to its original position at distance d1 from side piece 2. The slot 8 may be cut as shown in FIG. 1b, so that the width d4 of the slot near the base is greater than the width d3 near the top of the slot 8 to produce the spring biasing. This non-parallel slot-width spacing introduces a required spring bias. As the dimension d3 is widened by turning the adjustment screw 6 inward, the spring force F1 created by outward deflection of the live hinge will try to return the sides 2, 3 inward to their original orientation with the live hinge in its relaxed state. Thus, there will be a spring pressure throughout the live hinge's range of adjustment, which eliminates the need for a separate spring to perform the same function.

The use of Wired or Conventional Electric Discharge Machining (EDM) permits the slots to be made non-parallel, as shown in FIG. 1b in almost any configuration that achieves low stress condition necessary for functional and stable live hinges. While Conventional and Wired EDM are described herein, other high speed machining is permissible as well as injection molding using various composites.

Figure 2:
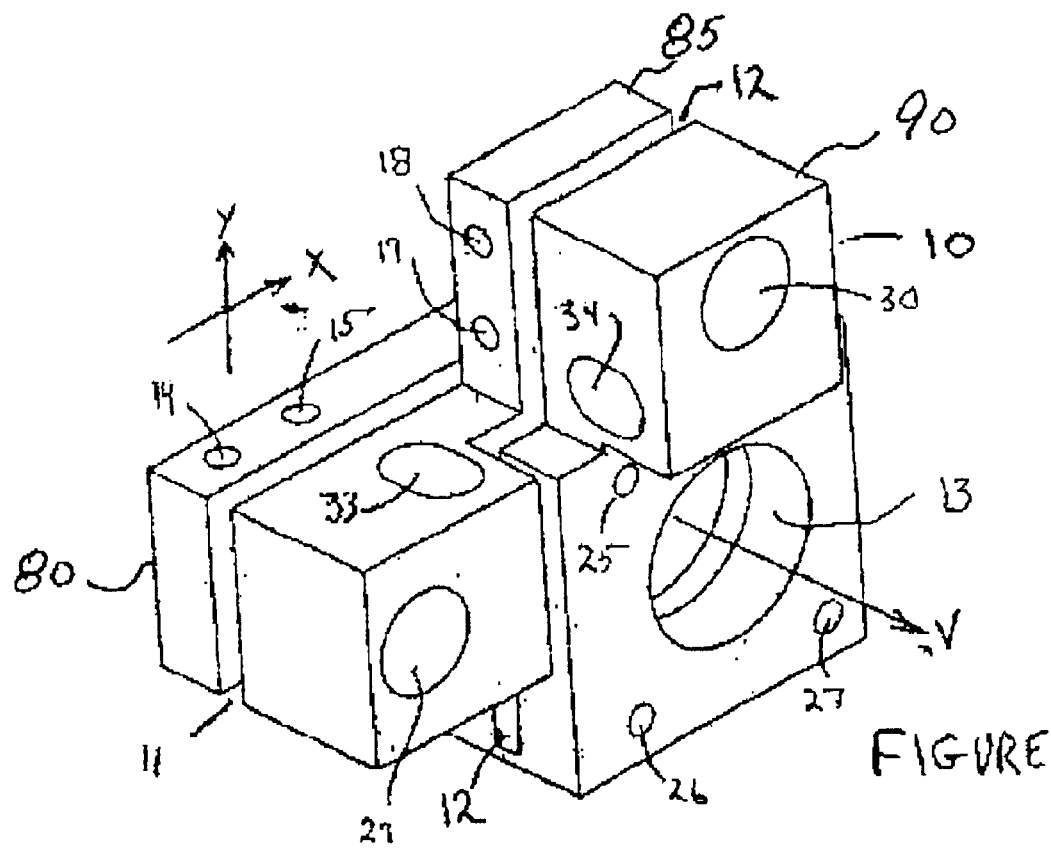
FIG. 2 shows a right front-quartering view of a two axis optical component mount without locking flexure clamps or optional optical component holder
Figure 3:
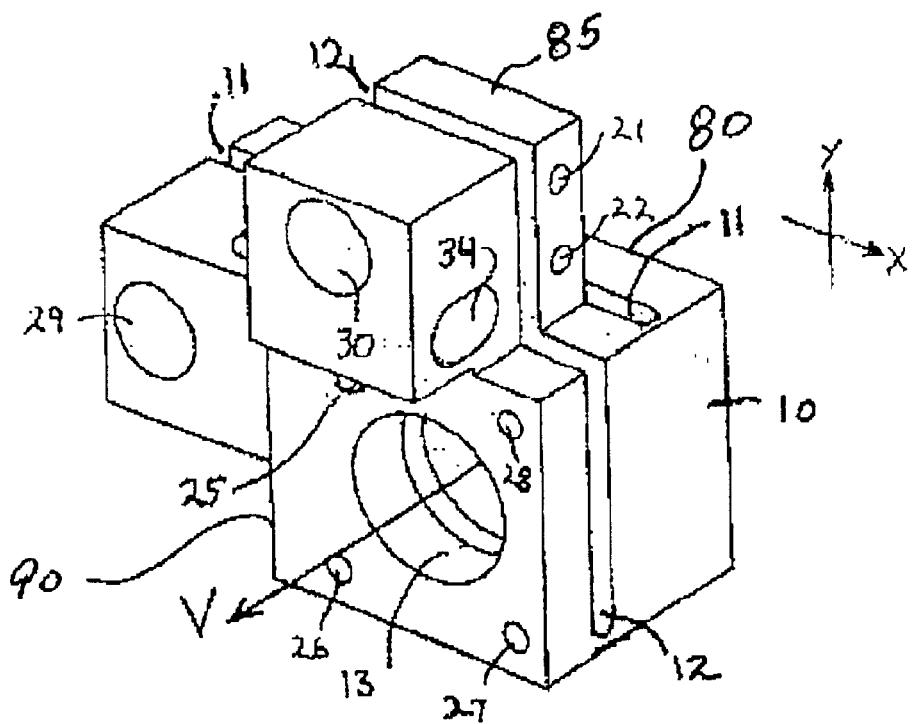
FIG. 3 shows a left front-quartering view of a two axis optical component mount without locking flexure clamps or optional optical component holder

The slots of live hinges 11 and 12 in FIGS. 2 and 3 may be cut as shown in FIG. 1b, so that the width d4 of the slot near the base is greater than the width d3 near the top of the slot to produce the spring biasing. This non-parallel slot-width spacing introduces a spring bias, and as the dimension d3 is widened during adjustment of mount 10 by turning the adjustment screw inward, the spring force created by outward deflection of the live hinge will try to return the sides inward to their original orientation with the live hinge in its relaxed state.

Alternatively, an external spring element could be utilized with posts (not shown) affixed on opposing sides across slots of live hinges 11, 12 and a bias spring (not shown) coupled to the posts. The spring and posts could be temporary during the adjustment stage or permanent. A large clothespin type unit could provide the temporary spring bias and be removed once alignment is completed. The prior art also teaches of various means to provide an outward spring bias providing a resistance to decreasing the gap between the slots such as an internal spring and an outward biasing of the plates.

Mounted with relation to hole 4b in FIG. 1a is a component of the optical/laser system in which the live hinge is used, such as lens 5, that has an optical axis V1. As screw 6 is turned inward, side piece 3 is forced away from side piece 2. This movement of side piece 3 causes the optical axis of lens 5 to shift from V1 to V2, as shown, creating an angular change of angle θ.

This illustrates the action of the live hinge used to adjust the optical axis V1 of optical element 5 up or down, or one degree of freedom. According to the present invention, incorporating a second live hinge with its hinge axis oriented approximately transversely to the axis of the first live, the optical axis of optical element 5 can also be adjusted in an additional degree of freedom. Thus the optical adjustment can be adjusted in two directions, such as up/down and right/left to align the optical element. As discussed, other optical elements such as, but not limited to, mirrors, beamsplitters, fiber optic devices, prisms, and fiber optic cable can similarly be held for alignment.

Figure 4:
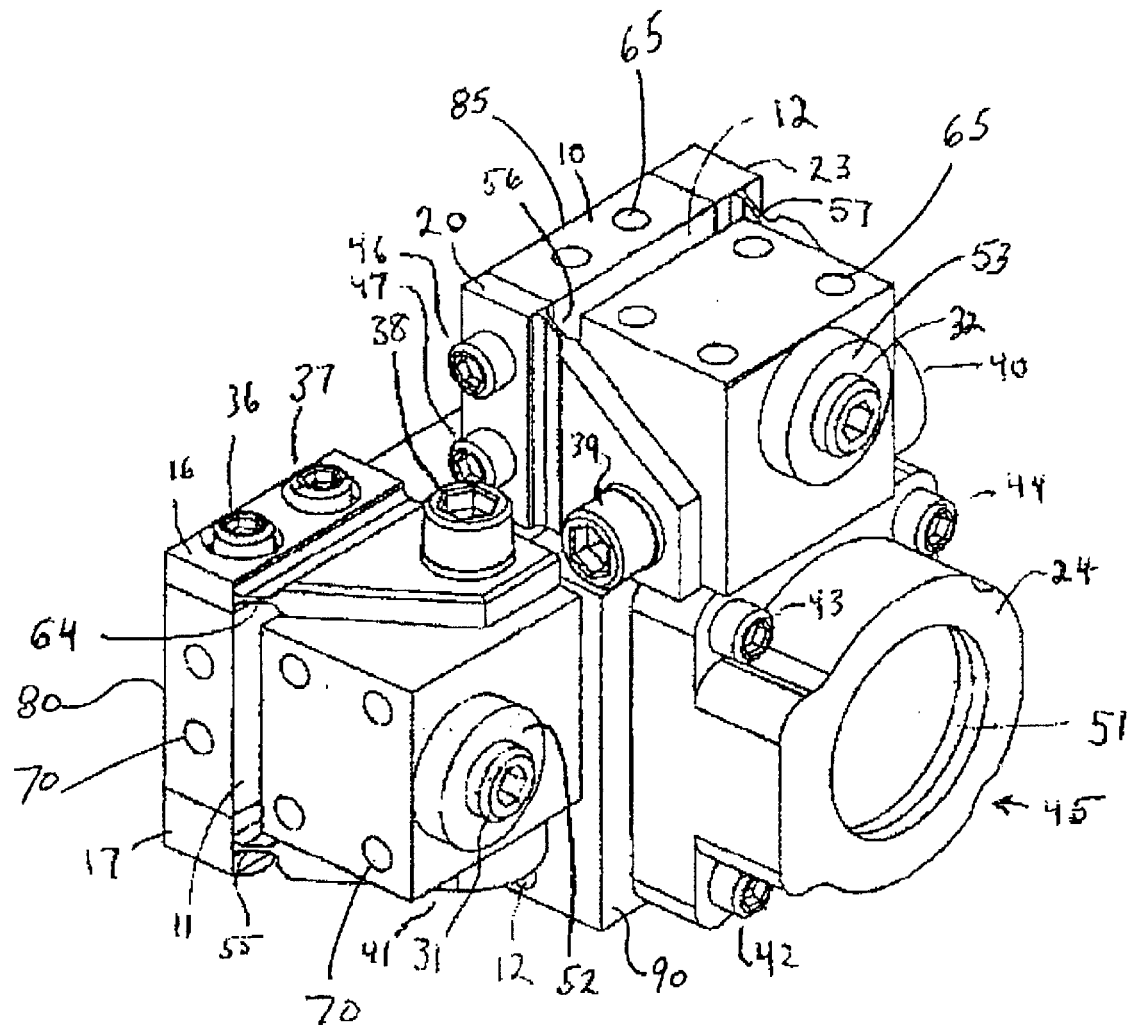
FIG. 4 shows a right front-quartering view of the optical component mount of a two axis optical component mount with locking plates and optical receptacle

One preferred embodiment of optical component mounting 10 is described herein with reference to FIG. 2 through FIG. 4. FIG. 2 shows one view of the basic optical component mounting 10. Mounting 10 is preferably machined from a solid block of material and has two narrow slots forming live hinges 11 and 12 cur through most of the block thickness to create the live hinges 11 and 12. While all Figures show the width of the open slot creating live hinges 11 and 12 being uniform, when the slots of hinges 11 and 12 are being cut by machine processes, and the width of the slot can be cut narrower at the open end of the slot, and wider at the closed end of the slot and with varied widths. In this manner there is a spring force present caused by forcing the ends apart as the open end is forced apart by an adjusting screw, as detailed herein.

FIGS. 2 and 3 show the spacing between the front portion or front plate 90 and the middle portion or middle plate 85 of mount 10, set by live hinge 12, and the spacing between the middle portion 85 and the rear portion or base plate 80 of mount 10, set by live hinge 11, as parallel, but as indicated herein, the spacing may be other than parallel. The orientation of the hinges 11, 12 are designed in order to provide the alignment required for a given application. In certain applications a single live hinge might suffice wherein only a single degree of freedom is required for alignment, In the preferred embodiment, the hinges 11, 12 are orthogonal in the X/Y direction, providing alignment in the X and Y direction. Other orientations are within the scope of the invention to provide stable alignment mechanisms for angles other than orthogonal.

The preferred material of mounting 10 is metal for extreme stability over environment and time. Other resilient materials, such as plastic or composites, may also be used with injection molding in certain applications and requirements. The various machining and molding technologies allow for a very small mounting 10 with very narrow slots of live hinges 11 and 12. In either case, a mounting 10 as small as 0.25 inches square can be used to hold one end of a fiber optic cable or bundle of fibers, or a very small optic element of any kind. Thus, one application of this adjustable mount uses mounting 10 for adjusting the optical axis of the optic with respect to the optical axis of other optical components mounted on an optical bench. The locations and orientations of the two transverse narrow slots of live hinges 11 and 12 are better understood by comparing FIGS. 2 and 3. In the embodiment shown, slots of live hinges 11 and 12 can be made as small as only a few thousandths of an inch wide, resulting in the live hinges used for adjustment purposes as generally described with reference to FIG. 1a.

It can be seen in FIGS. 2 and 3 that slots creating the two live hinges 11, 12 are both parallel to each other. It can also be seen in FIGS. 2 and 3 that the live hinge flex points at the bottom of slots of live hinges 11 and 12 are perpendicular with respect to each other in this embodiment. The bottom of the slot of live hinge 12 can be seen in FIGS. 2 and 3, and the bottom of the slot of live hinge 11 can only be seen in FIG. 3. The deflection of each live hinge 11, 12 takes place on its thinner front side, when the top of the slot of live hinge 12 is widened through the action of this live hinge, there is a tilting of the optical axis V in the negative Y direction. As the top of the slot of live hinge 12 is narrowed through the action of this live hinge, V similarly tilted upward in the positive Y direction. Likewise, as the top of the slot of live hinge 11 is widened through the action of this live hinge, V is tilted toward the right along the plane of the X axis in the positive X direction. As the top of the slot of live hinge 11 is decreased by the action of this live hinge, V is moved toward the left in the negative X direction. Accordingly, when the two live hinges 11, 12 are implemented as shown, there is an X and Y angular adjustment of an optical element mounted in bole 13 of mounting 10.

By orienting live hinges 11 and 12 as shown in FIGS. 2 and 3, a change in adjustment of the width of the slot of live hinge 11 will not affect the adjustment of the existing slot width of live hinge 12, and visa versa. Without this isolation, the cross effect makes adjustment difficult. This effect is known as cross talk, and it occurs when the placements of adjustment hinge points is such that the resulting X and Y motions are not independent of each other. The present design has negligible cross talk.

Figure 5:
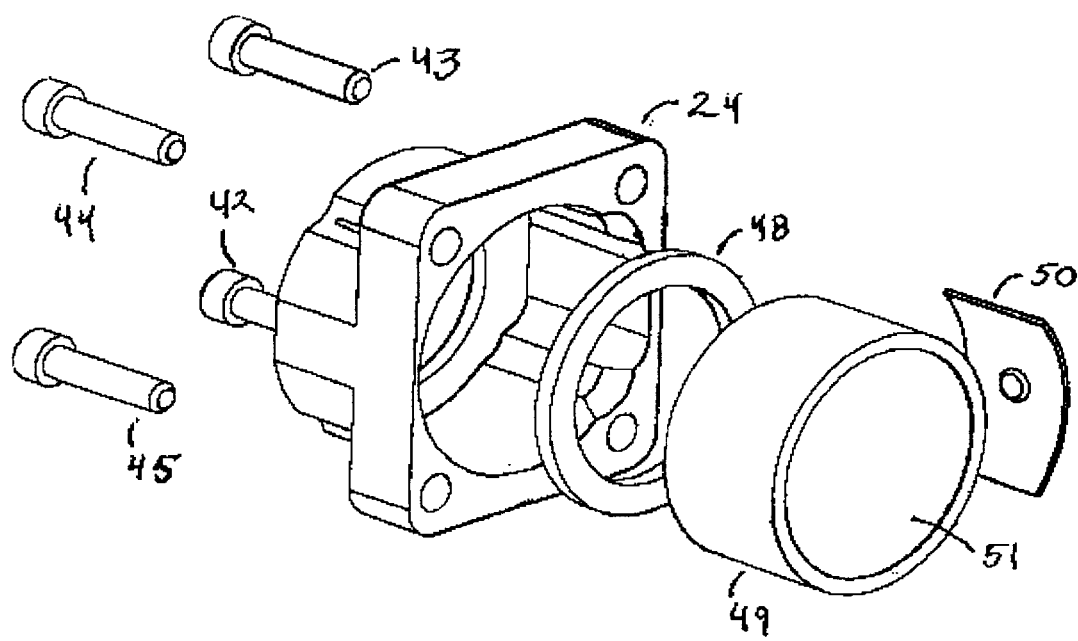
FIG. 5 shows a reverse view of an element holder used to retain optical elements in the component mount

Hole 13 passes through mounting 10 permitting various optical elements to be coupled therein. For example, an element holder 24 for mounting an optical component, such as a mirror 51, is shown in FIGS. 4 and 5 attached to mounting 10 and in alignment with hole 13. The axis of hole 13 is represented in FIGS. 2 and 3 by V, aligned as necessary relative to a beamline of an optical bench or other laser system on which mounting 10 is affixed. In this description the front of mounting 10 is looking into hole 13. The X and Y axes of mounting 10, used herein as references in describing mounting 10, are also shown in FIGS. 2 and 3.

As shown in FIGS. 2 and 3, there are additional holes located in or through mounting 10 (14, 15, 18, 19, 21, 22, 25, 26, 27, 28, 33, 34, and 35) are used in attaching mounting 10 to attaching the locking plates 16, 17, 20 and 23, for accommodating live hinge locking screws 38 and 39, and in attaching an optical holder 24 to mounting 10, as shown in FIGS. 4 and 5. The holes 29 and 30 are used for accommodating adjustment screws 31 and 32 shown in FIG. 4.

Referring to FIGS. 2, 3, and 4, holes 14 and 15 in FIG. 2 are used to attach a top side locking plate 16 to mounting 10. Opposing holes on the bottom of mounting 10, not seen in FIGS. 2 and 3, are used to attach bottom side locking plate 17 to mounting 10. Holes 18 and 19 in FIG. 2 are used to attach left side locking plate 20 to mounting 10 with screws 42 and 43. Holes 21 and 22 in FIG. 3 are used to attach right side locking plate 23 to mounting 10 with screws (not shown).

In addition, holes 25, 26 and 27 in FIG. 2, and hole 28 in FIG. 3, are used in attaching element holder 24 in FIG. 5 to mounting 10 with screws 42, 43, 44 and 45 (not seen), as shown in FIG. 4. Element holder 24 holds optical elements, such as lens 5 in FIG. 1a, or a mirror, prism, reflector or the end of a fiber optic cable.

For the purposes of describing this preferred embodiment, mirror 51 is mounted in element holder 24 as shown in FIGS. 4 and 5. In FIGS. 2 and 3 there is a hole 29 that is used for attaching adjustment screw 31, shown in FIG. 4, that is used to adjust live hinge 11 to tilt the optical mirror 51 along the plane of the X axis. Similarly, in FIGS. 2 and 3 there is a hole 30 that is used for attaching adjustment screw 32, shown in FIG. 4, that is used to adjust live hinge 12 to change the angle of the mirror 51 along the Y axis. As previously described with reference to the general description of the live hinge shown in FIG. 1a, X and Y adjustments are accomplished using adjustment screws 31 and 32.

The preferred embodiment of this adjustable mount uses a completely different approach to locking the alignment settings than the prior art. The alignment settings are made using adjustment screws 31 and 32, as shown in FIG. 4, to adjust live hinges 11 and 12, respectively. Once the alignment process is completed, the system is locked according to the description herein with negligible cross talk from the locking mechanism making the adjustment. In a preferred method of alignment, the adjustment screws 31, 32 are backed off from the contact with the respective plates. The locking is so effective that insignificant plate movement is experienced when the screws are backed off. There are significant benefits to the long term stability of a mount accomplished by backing off the adjustment screws and removing a contact pressure point from the adjusted plate. This is especially important where the materials for the threaded insert and the screw are of different materials to prevent galling and therefore have different thermal properties.

The design of mounting 10 is configured such that three major portions, a rear portion 80, a middle portion 85, and a front portion 90. The rear portion 80, in which holes 14 and 15 are located, is to the rear of the slot of live hinge 11. This rear portion 80 is used to attach mounting 10 to a frame, chassis, or optical bench. The middle portion 85 includes the holes 18, 19, 21, 22, 29 and 33. The third portion is the front portion 90 in which holes 13, 25, 26, 27, 28, 30, and 34 are located. These three portions 80, 85, 90 are connected at the flex joint of live hinges 11 and 12 as can be seen in FIGS. 2 and 3.

Top side locking plate 16 is attached to the rear portion 80 of mounting 10 by fastening screws 36 and 37 into holes 14 and 15, as shown in FIGS. 2 and 4. Bottom side locking plate 17 is attached to the lower side of the rear portion 80 in similar fashion by two screws (not shown). Hole 33 in FIG. 2 passes through the middle portion 85 and is ovally elongated as a slot in the preferred embodiment to facilitate the adjustment of live hinge 11. A locking screw 38 extends through a hole in top side locking plate 16, through elongated hole 33, and into a nut 41 (indicated, but not shown) that is attached to bottom side locking plate 17.

In FIG. 4, the live hinge 11 adjustment screw 31 extends through hole 29, and touches the rear portion 80 of mounting 10. In operation, when it is desired to adjust live hinge 11, locking screw 38 is loosened. Adjustment screw 31 is turned clockwise or counter clockwise to adjust the X direction angle of the optical axis of mirror 51. The mirror 51 is mounted in 24 attached to the front portion of mounting 10 by screws 42, 43, 44, and another screw 45 (not shown) in FIG. 4 that extend into boles 25, 26, 27 and 28 in FIGS. 2 and 3. After the X axis adjustment is completed, locking screw 38 is tightened to clamp the middle portion 85 of mounting 10 between top side locking plate 16 and bottom locking plate 17. In this manner the X axis optical adjustment is maintained and is not changed when the adjustment locking takes place.

In FIG. 4, left side locking plate 20 is attached to the middle portion 85 of mounting 10 by screws 46 and 47 that screw into holes 18 and 19 (see FIG. 2). Right side locking plate 23 is also attached to the middle portion 85 of mounting 10 by screws (not shown) that screw into holes 21 and 22 shown in FIG. 3. It should also be noted that hole 34 in FIG. 2 is also elongated (oval) also called a slot in the preferred embodiment through the front portion 90 of mounting 10 to facilitate adjustment of live hinge 12. A locking screw 39 extends through a hole in left side locking plate 20, through elongated hole 34 through the front portion 90 of mounting 10, and into a nut 40 (not shown) attached to right side locking plate 23. In FIG. 4, there is also a live hinge 12 adjustment screw 32 that extends through hole 30, seen in FIGS. 2 and 3, and touches the rear portion 80 of mounting 10.

When it is the desired to adjust live hinge 12, locking screw 39 is loosened. Adjustment screw 32 is then turned clockwise or counter clockwise to adjust the Y angular direction of the optical axis of mirror 51 that is mounted in holder 24. After the Y axis adjustment is completed, locking screw 39 is tightened to clamp the front portion 90 of mounting 10 between left side locking plate 20 and right side locking plate 23. In this matter the Y axis adjustment is maintained and is not changed when the adjustment locking takes place.

Ideally both locking screws 38 and 39 would be loose when adjusting the spring biased live hinges 11, 12 with sufficient force to make the adjustment with the adjustment screws 31, 32. Once aligned, the locking plates 16, 17 and 20, 23 sandwich the respective alignment axes as the corresponding locking screw 38, 39 is tightened.

It is desirable to provide for substantially frictionless motion of the live hinges in the unclamped (unlocked) condition. Therefore, a shim (not shown) may be used on the side locking plates 16, 17, 20 and 23 to out approximately 0.0005 inch to permit unimpeded motion in the unclamped (unlocked) condition. Alternately, the flexure of the locking plates can be machined with this clearance by design.

The locking capability does not change the adjustment of mounting 10, wherein the side locking plates 16, 17, 20 and 23 are placed so that the movable parts of mounting 10 (the front portion 90 and middle portion 85 of mounting 10) can freely move prior to tightening the locking screws 38 and 39. In one embodiment, in order to insure this free movement, very thin spacers of low friction material, such as plastic, can be placed between the side locking plates and the movable parts of mounting 10 (the front portion 90 and middle portion 85 of mounting 10 previously described).

When locking screw 38 or 39 is tightened, the force applied is orthogonal to the X-Y plane (whichever plane in which live hinge movement for adjustment is allowed) which results in no stress applied thereon, and therefore there is no unwanted movement in the alignment plane. In this way, the alignment is unaffected by the clamping force. Stated another way, if locking screws 38 and 39 are tightened, for example, to four foot-pounds to lock the live hinges 11, 12 and temperature or other environmental changes cause the screws to change dimension such that their torque changes up or down to perhaps two foot-pounds or six foot-pounds, the optical adjustment is not affected by the change.

In FIG. 4 elements 52 and 53 are internally threaded tubular elements with flattened annular head portions. The flattened annular portions are shown in FIG. 4, and the tubular portions of elements 52 and 53 extend into holes 29 and 30 (FIGS. 2 and 3), respectively, where they are not seen. The flattened annular portions of elements 52 and 53 lie under the head of their associated adjusting screws 31 and 32, and their tubular portions extend and are preferably bonded into the hole 29 or 30 with an adhesive. That is, the tubular portion of washer 52 extends into hole 29, and the tubular portion of washer 53 extends into hole 30. Adjustment screws 31 and 32 turn into the threaded portions of their associated tubular elements 52 and 53 to provide the adjustment capability of living hinges 11 and 12. The ends of adjustment screws 31 and 32 may be rounded hemispherical and polished to reduce friction, and ride against the inner surface of the far side of the living hinge that they bridge. For example, rounded end of adjustment screw 31 rides against the rear portion of mount 10, and the rounded end of adjustment screw 32 rides against the middle portion of mount 10. To prevent galling dissimilar metals for the adjustment screws 31, 32 and the threaded portions of the inserts 52, 53 would be preferred.

Adjustment screws 31 and 32 have a uniform, fine thread along their length in the preferred embodiment of the invention but, alternatively, these adjustment screws can each have two different pitch threads thereon. For example, the portion of each screw 31 and 32 nearest the heads can have a 32 pitch, while the lower end of the screws nearest the tips can have a 40 pitch, which provides a more sensitive adjustment of living hinges 11 and 12. Tighter pitches of 80 or 100 are also known in the art.

The adjustable mounting herein described provides an adjustment and locking mechanism that insures long-term retention of mirror 51 alignment in high shock and vibration environments, and does this without affecting the alignment when the locking mechanism is applied.

Manufacturing efficiency and enhanced quality of the adjustable mounting can be achieved by using wire EDM that allows the stacking of side locking plates for manufacturing up to nine inches thick, so that many side locking plates can be machined at one time. EDM also produces a substantially smooth surface finish on mounting 10, which is important for reducing the occurrence of stress concentrations at tool marks, which can occur when these features are made with conventional machine tools.

The use of orthogonal side locking plates 16, 17, 20 and 23 to lock mirror 51, once it has been adjusted, in a way that does not disturb the adjustment, provides stability in high mechanical and thermal shock environments, including cryogenic environments. This results in significant labor savings during the alignment of optic systems. The benefits are not limited to mirrors. Any optical component requiring fine mechanical adjustment and requiring that the final adjustment be secured will benefit from the use of this adjustable mounting.

In the preferred embodiments, side locking plates 16, 17, 20 and 23 have a thinned-down portion 54, 55, 56 and 57. The thinned down portions 54, 55, 56 and 57 may be produced with Wire EDM machining to create the live hinge in each of the side locking plates. This has the effect of allowing side locking plates 16, 17, 20 and 23 to flex along the axis of the live hinge so that they will clamp the live hinges 11 and 12 without causing stresses, and yet will be non-compliant in the direction of adjustment so that they will provide a stable clamp.

FIG. 5 shows a view of the back or reverse side of element holder 24 that is first described above with reference to FIG. 4. To help orient FIG. 5 with reference to FIG. 4, mounting screws 42 through 45 are shown. As previously described, element holder 24 holds optical elements such mirror 51 in a cup 49 as shown in this Figure.

Stable mounting of mirror 51 can be accomplished by spring loading, as shown in FIG. 5, because mirror 51 does not have precise features to use for mounting purposes. The optically flat surface of mirror 51 is held firm by a wave washer 48 or other spring. Wave washer 48 has the advantage that its applied force will not change over temperature. The force required is determined by the shock environment the assembly will be subjected to. Typically, some large fraction of a pound is enough force. A side spring 50 made from strip steel presses mirror 51 sideways into two mounting blocks (not seen) on the inside walls of element mount 24 to make a semi-kinematic mount. Cup 49 in which mirror 51 is mounted does not have critically close tolerances, because the precision tolerance is on the mounting surface, and is determined by the required stability of mirror 51. The greatest stability is achieved by optically machining or polishing the mounting surfaces.

Another feature of the embodiment of this adjustable mount is that the material from which optical component mounting 10 is machined can be chosen for its coefficient of thermal expansion (CTE). This allows, for example, a material with a CTE that matches that of the mirror or other optical element to be adjusted, or that matches the base to which component mounting will be mounted. This match of CTE reduces stresses in mounted optical components and increases thermal stability of the optical system.

The various holes 65, 70 in FIG. 4 illustrate an alternate embodiment, wherein the holes are use to attach a separate adjustment mechanism (not shown) as a replacement for the adjustment screws 31, 32. In this alternative embodiment a separate adjustment tool would be screwed into the holes 65, 70 and could employ a differential micrometer or similar adjustment device to set the tilt angle before clamping the locking screws 38, 39. Once the alignment is completed, the alignment tool could be removed as the clamping aspects of the present invention would secure the alignment.

One embodiment the present invention is used in conjunction with optical fibers, and the alignment of a single fiber or a bundle of fibers are secured by the present optical mount. It is well known in the industry that a bundle of fibers can be aligned over an array of photonic detectors and/or emitters. In lieu of the mirror 51, the element holder 24 would be configured to retain the optical fibers.

Numerous characteristics and advantages have been set forth in the foregoing description, together with details of structures and functions of the present invention, and some of the novel features thereof are pointed out in appended claims. The disclosure, however, is illustrative only, and changes may be made in arrangement and details, within the principle of the invention, to the full extent indicated by the broad general meaning of the terms in which the appended claims are expressed. For example, the description of screws for the various securing members can be replaced by other members that are known in the art. The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A mounting apparatus for mounting an optical element such that the optical axis of the optical element is substantially aligned with corresponding elements in an optical system, said apparatus comprising:
   a mounting body with a first section and a second section separated by a gap and coupled by a flexible hinge forming a live hinge, wherein said first section and said second section have a hinged end at said flexible hinge and a free end opposing said hinged end, and wherein said first section has an optical receptacle for securing said optical element;
   an adjusting means for changing said gap between the first section and the second section at the free end, thereby adjusting an angular alignment in a first direction;
   a spring means coupled to said first section and said second section providing resistance to increasing said gap; and
   a locking means coupled to said first section and said second section securing said angular adjustment, wherein said locking means applies a contact force substantially perpendicular to said first direction without imparting said contact force in said first direction.

2. The mounting apparatus according to claim 1, wherein said locking means is a pair of plates secured proximate said free end on either side of said first section and said second section, and wherein said plates extend across said gap and are secured to said first section and said second section.

3. The mounting apparatus according to claim 1, wherein said adjusting means is a screw threaded through said first section and contacting said second section thereby changing said gap.

4. The mounting apparatus according to claim 1, wherein said mounting body is unitary and wherein said flexible hinge is a remaining portion of said mounting body with a slot substantially through most of said mounting body creating said gap between said first section and said second section.

5. The mounting apparatus according to claim 1, wherein said flexible hinge is a separate portion of flexural material secured at said hinged end between said first section and said second section.

6. The mounting apparatus according to claim 1, wherein said optical element is selected from the group comprising: a lens, a mirror, a single optical fiber, an optical fiber bundle, a grating, and a prism.

7. The mounting apparatus according to claim 1, wherein said spring means is selected from the group comprising: an external spring mounted across said gap at said free end, a clamp structure clamped across said gap, and an inward bias force introduced by a width of said gap being less at said free end and larger at said hinged end.

8. A two axis gimbal mounting structure for alignment of an optical element, comprising:
   a mounting body having a base plate, a middle plate and a front plate with said base plate and middle plate separated by a first slot and coupled by a first flexible hinge at a first hinge end providing angular adjusting on a first axis, and said middle plate and said front plate separated by a second slot and coupled by a second flexible hinge at a second hinged end providing angular adjustment on a second axis, wherein said first hinge end and said second hinge end are substantially orthogonal, and wherein said optical element mounts to said front plate;
   a first means for angularly adjusting said first axis of said optical element by changing a gap dimension of said first slot at an adjusting end opposing said first hinge end;
   a second means for angularly adjusting said second axis of said optical element by changing a gap dimension of said second slot at an adjusting end opposing said second hinge end;
   a first locking mechanism sandwiching said base plate and said middle plate using force perpendicular to said first axis without imparting force along said first axis; and
   a second locking mechanism sandwiching said middle plate and front middle plate using force perpendicular to said second axis without imparting force along said second axis.

9. The two axis gimbal mounting structure according to claim 8, further comprising an inward spring bias of said first slot and said second slot to provide an opposing resistance to increasing said gap dimension.

10. The two axis gimbal mounting structure according to claim 8, wherein said first and second means for angularly adjusting said respective first and second axis is a removable alignment mechanism that is secured across said adjusting end.

11. The two axis gimbal mourning structure according to claim 8, wherein said first means for angularly adjusting said first axis is an elongated member threadably engaging said middle plate and contacting said base plate, thereby altering said gap dimension of said first slot.

12. The two axis gimbal mounting structure according to claim 8, wherein said second means for angularly adjusting said second axis is an elongated member threadably engaging said front plate and contacting said middle plate thereby altering said gap dimension of said second slot.

13. The two axis gimbal mounting structure according to claim 8, further comprising an outward spring bias of said first slot and said second slot to provide an opposing resistance to decreasing said gap dimension.

14. An apparatus for mounting an optical element with optical axes aligned with the optical axes of other elements in an optical system, said apparatus comprising:
   a unitary mounting body having a base section, a middle section and a front section, each section substantially parallel and coupled to each other by small sections, a first small section forming a first live hinge between said base section and said middle section having a first free end opposing said first small section and a second small section forming a second live hinge substantially orthogonal to said first live hinge between said middle section and said front section orthogonal with a second free end opposing said second live hinge, with each section substantially separated from each other by a respective first and second gap, wherein said first and second gap is formed from narrow slots extending substantially through said mounting body leaving said respective small sections, said first and second live hinge being substantially orthogonal;
   a first adjustment member threadably interconnecting said middle section and contacting said base section thereby altering said first gap and wherein said first live hinge provides a tilt adjustment along a first axis and;
   a second adjustment member threadably interconnecting said front section and contacting said middle section thereby altering said second gap, wherein said second live hinge provides a tilt adjustment along a second axis;
   a first pair of locking plates oriented on a side portion of said base section and said middle section proximate said first free end, said first pair of locking plates bridging said first gap and locking said base section to said middle section with a force substantially orthogonal to said first axis without imparting force along said first axis;
   a second pair of locking plates oriented on a side portion of said middle section and said front section proximate said second free end, said second pair of locking plates bridging said second gap and locking said middle section to said front section with a force substantially orthogonal to said second axis without imparting force along said second axis; and
   an optical receptacle on said front section for securing said optical element.

15. The apparatus for mounting according to claim 14, wherein said first and second pair of locking plates have a central flexure section.

16. The apparatus for mounting according to claim 14, wherein said first and second pair of locking plates use a locking bolt extending from said first and second pair of locking plates through a hole in said middle and front sections respectively, with a corresponding nut on the respective opposing first and second pair of locking plates.

17. The apparatus for mounting according to claim 16, wherein said hole is oversized.

18. The apparatus for mounting according to claim 14, wherein said first adjustment member and said second adjustment member are removed from contact with said respective base section and said middle section after alignment.

19. The apparatus for mounting according to claim 14, further comprising a threaded insert engaging said adjustment member, wherein said insert is a dissimilar material from said adjustment member.

20. The apparatus for mounting according to claim 14, further comprising a spring means selected from the group comprising: an external spring mounted across said first gap and said second gap, a clamp structure clamped across said first gap and said second gap, an inward bias force introduced by a width of said first gap and said second gap being less at said respective first free end and said second free end with respect to a width proximate said first and second live hinge, an internal spring mounted between said first gap and said second gap, and an outward bias force introduced by a width of said first gap and said second gap being greater at said respective first free end and said second free end with respect to a width proximate said first and second live hinge.

* * * * *